United States Patent [19]
Fassnacht et al.

[11] Patent Number: 6,146,113
[45] Date of Patent: Nov. 14, 2000

[54] COMPACT HYDRAULIC UNIT

[75] Inventors: Kurt Fassnacht, Rieneck; Hubert Kulawik, Partenstein; Günter Hartmann, Gemünden; Herbert Bock, Gräfendorf, all of Germany

[73] Assignee: Mannesmann Rexroth AG, Lohr// Main, Germany

[21] Appl. No.: 09/091,085

[22] PCT Filed: Dec. 18, 1996

[86] PCT No.: PCT/DE96/02477

§ 371 Date: Jun. 10, 1998

§ 102(e) Date: Jun. 10, 1998

[87] PCT Pub. No.: WO97/23733

PCT Pub. Date: Jul. 3, 1997

[30] Foreign Application Priority Data

Dec. 22, 1995 [DE] Germany ............. 195 48 204

[51] Int. Cl.$^7$ ............................................ F04B 17/00
[52] U.S. Cl. ......................................................... 417/367
[58] Field of Search ................................ 417/201, 367, 417/373

[56] References Cited

U.S. PATENT DOCUMENTS

| | | | |
|---|---|---|---|
| 2,321,126 | 6/1943 | Breuer | 417/367 |
| 2,787,720 | 4/1957 | Ethier et al. | 417/367 |
| 3,897,178 | 7/1975 | Palloch . | |
| 4,088,424 | 5/1978 | Hyatt et al. | 417/373 |
| 4,632,643 | 12/1986 | Nielsen | 417/367 |
| 4,818,188 | 4/1989 | Chan | 417/201 |
| 5,019,737 | 5/1991 | Bruno . | |
| 5,188,516 | 2/1993 | Huang | 417/201 |

FOREIGN PATENT DOCUMENTS

| | | | |
|---|---|---|---|
| 516474 | 1/1931 | Germany . | |
| 563483 | 11/1932 | Germany . | |
| 2244275 | 3/1974 | Germany . | |
| 2545304 | 9/1977 | Germany . | |
| 8207794 | 6/1982 | Germany . | |
| 3513472 | 10/1986 | Germany . | |
| 4421375 | 12/1995 | Germany . | |
| 6-58293 | 3/1994 | Japan | 417/367 |
| 596697 | 3/1978 | Switzerland . | |
| 205438 | 11/1967 | U.S.S.R. | 417/367 |
| 640667 | 7/1950 | United Kingdom | 417/367 |

*Primary Examiner*—Erick Solis
*Attorney, Agent, or Firm*—Martin A. Farber

[57] ABSTRACT

A compact hydraulic unit which can be used for cooling an electric motor sufficiently for continuous operation, having an annular cylindrical pressure medium container that has an outer external wall and an inner external wall as well as two end flanges, an electric motor that is sealed and is surrounded by the pressure medium container and cooled by a cooling air stream, and a hydraulic pump driveable by an electric motor. The pressure medium container fits closely around the electric motor and the inner external wall of the pressure medium container serves as a guide means for the cooling air stream flowing over the electric motor. By this, the entire volume of air flowing between the electric motor and the pressure medium container is fully utilized for cooling the electric motor and also flows closely along the housing of the motor over the winding heads of the electric motor that are located remotely from the single fan wheel. With a compact construction of the unit, sufficient cooling of the electric motor is guaranteed.

23 Claims, 19 Drawing Sheets

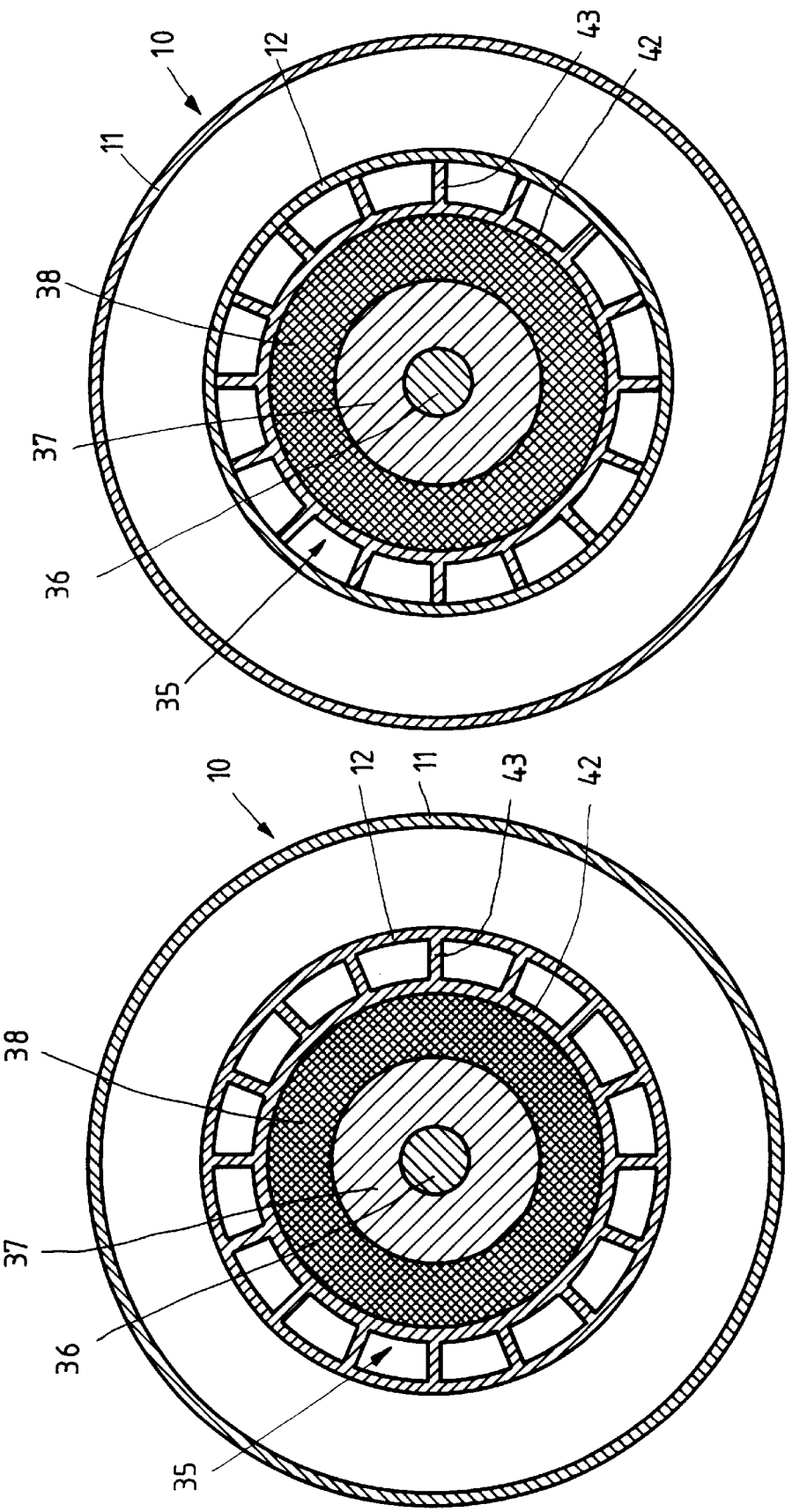

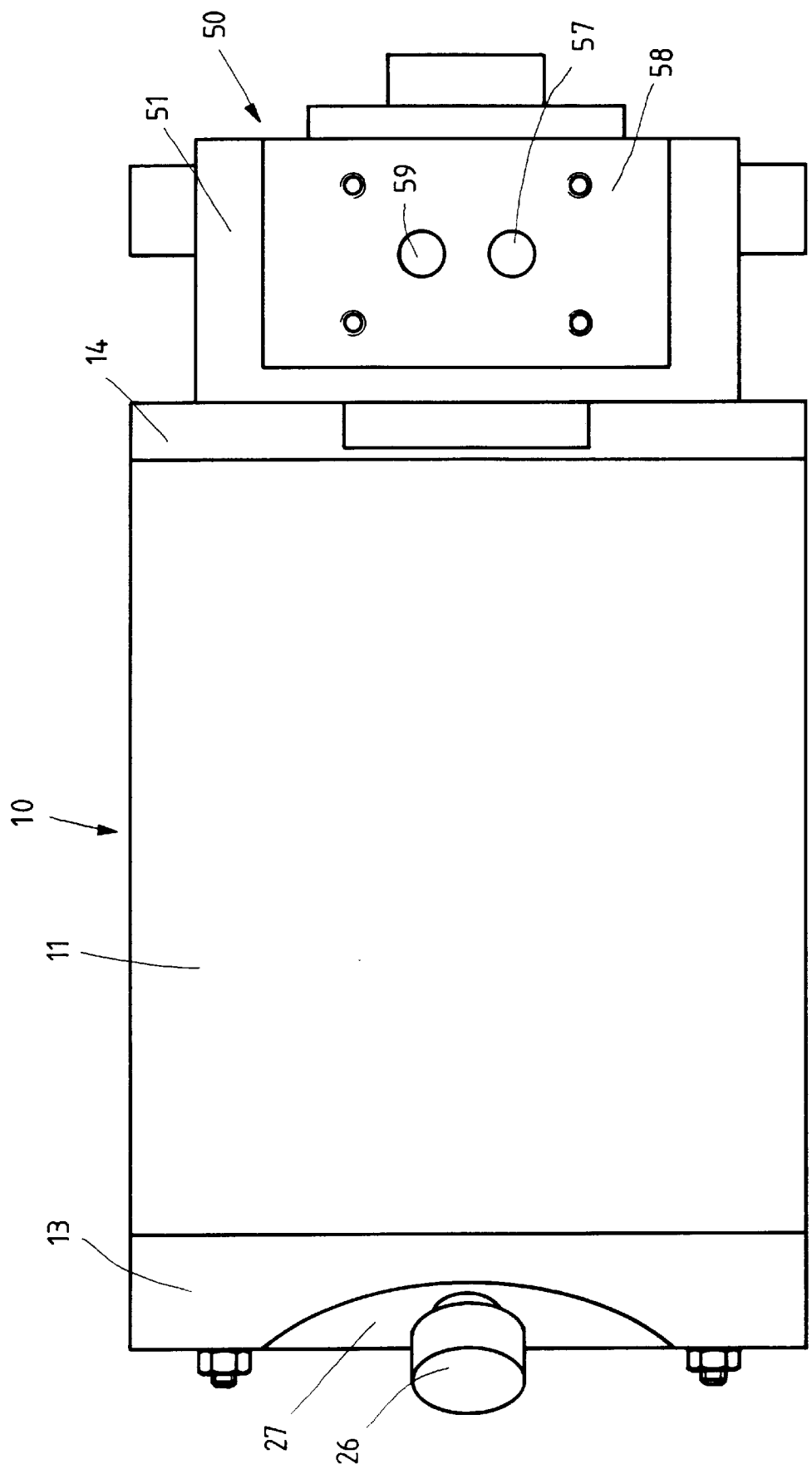

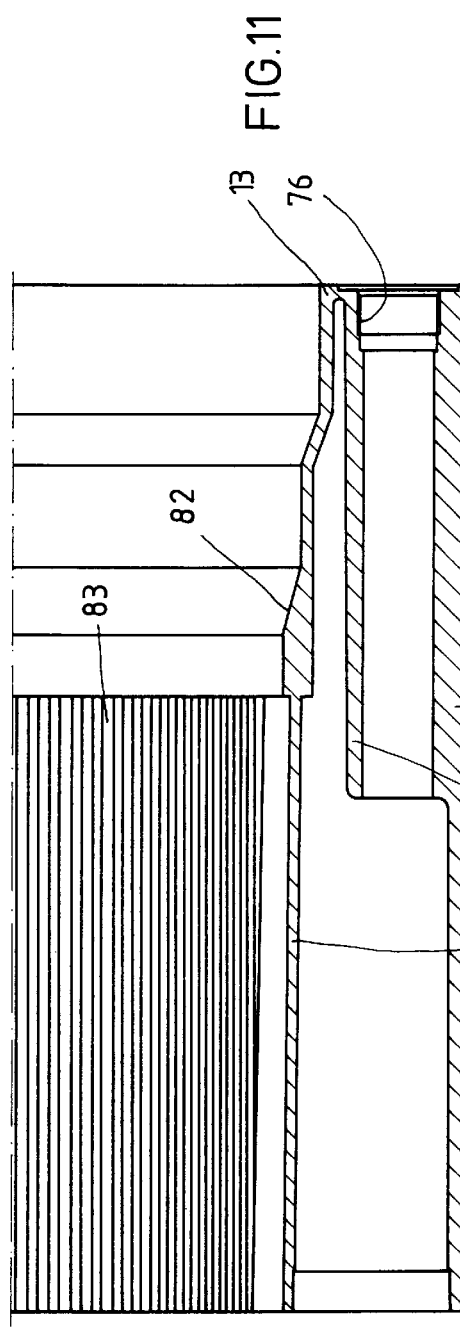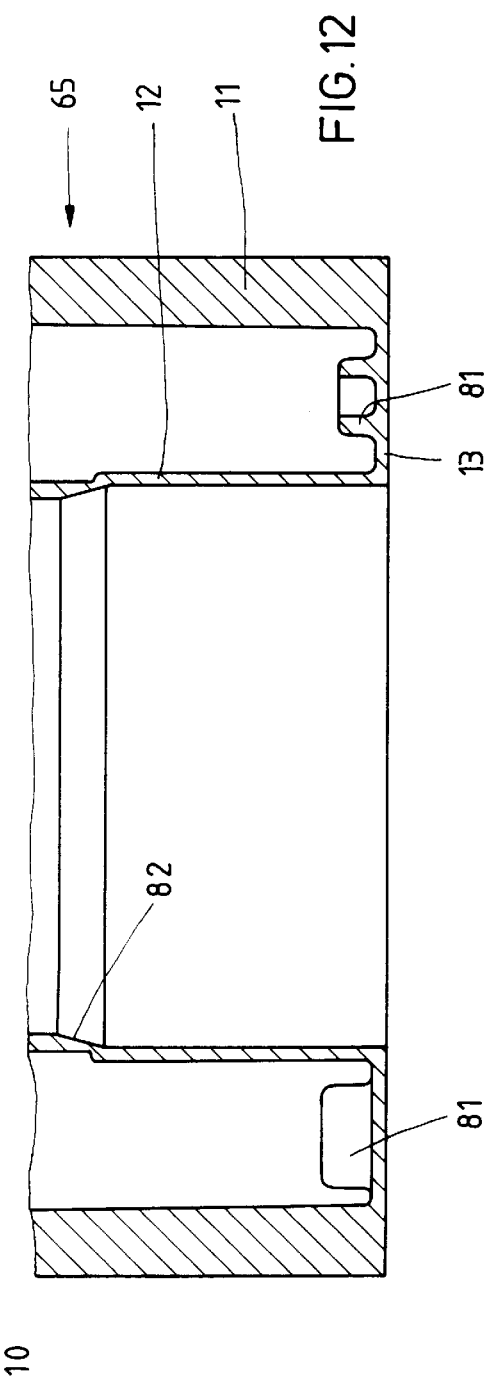

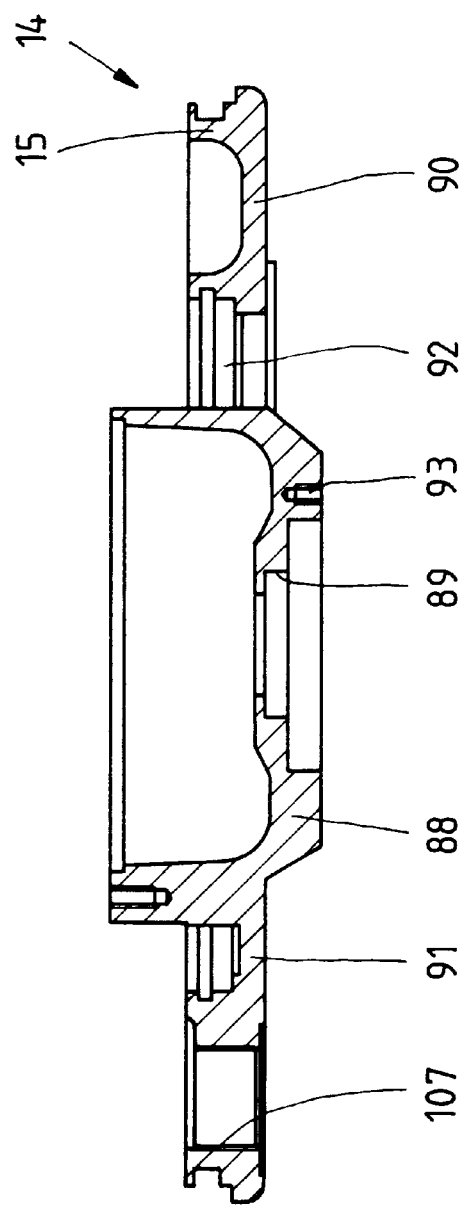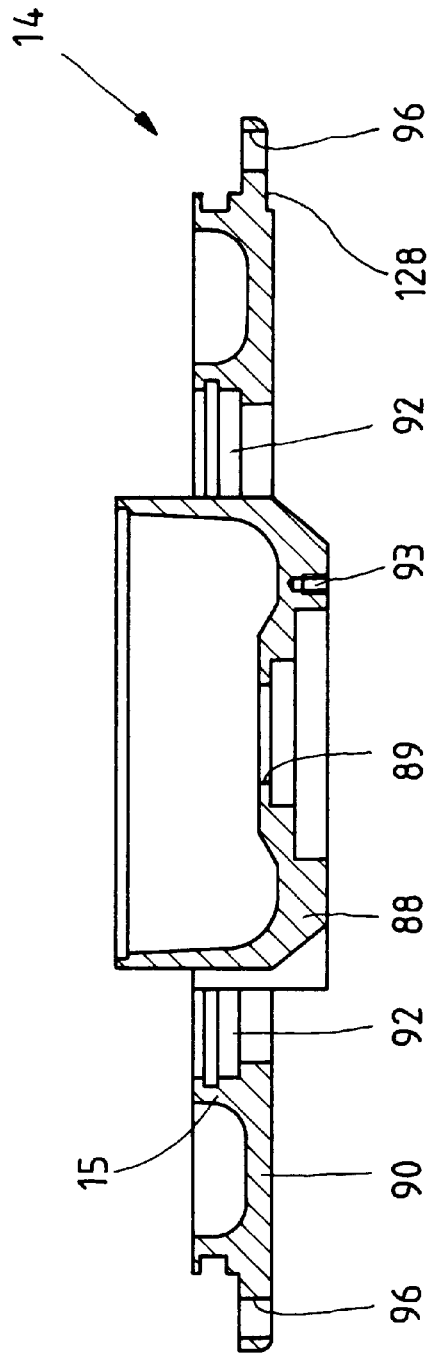

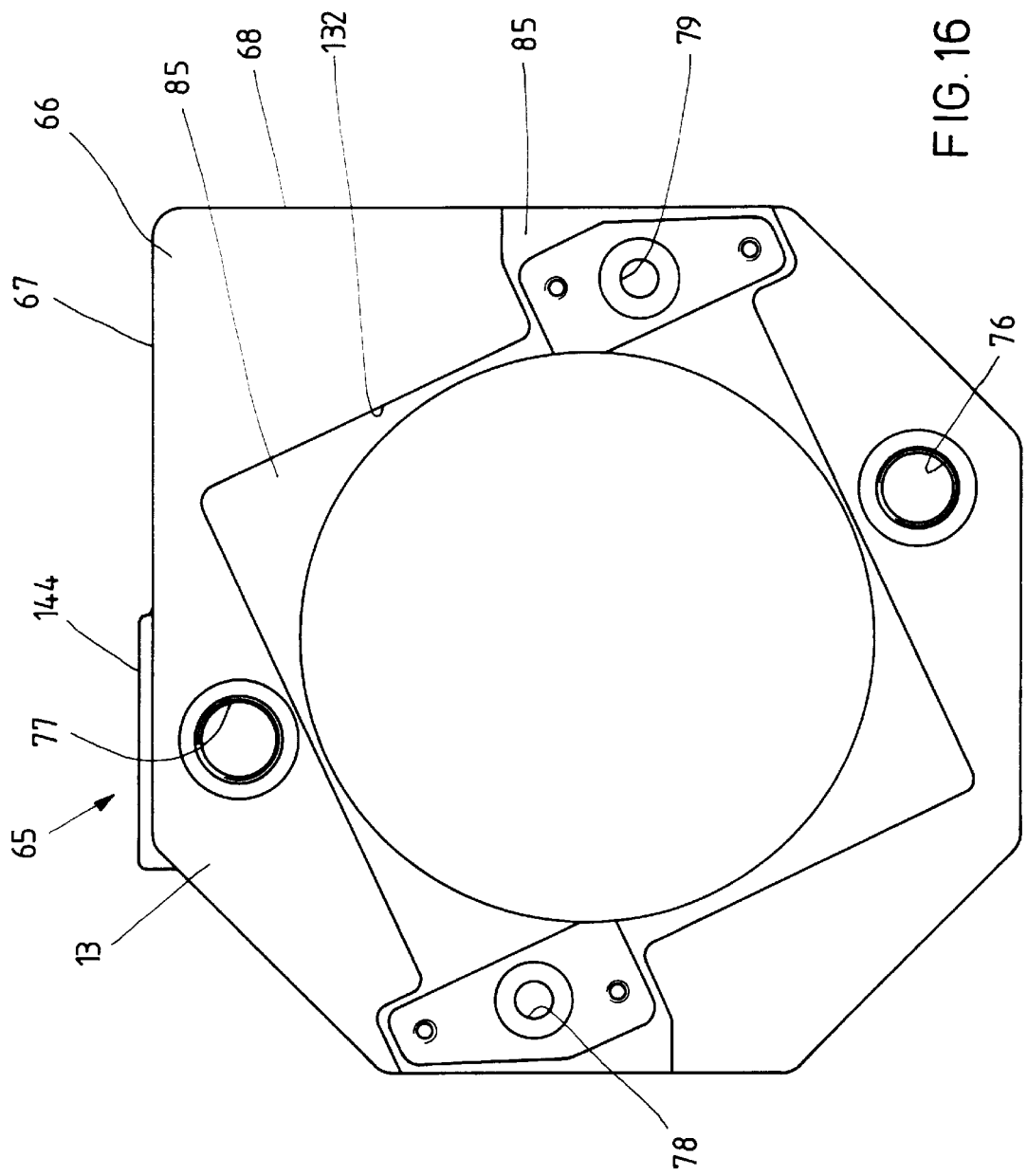

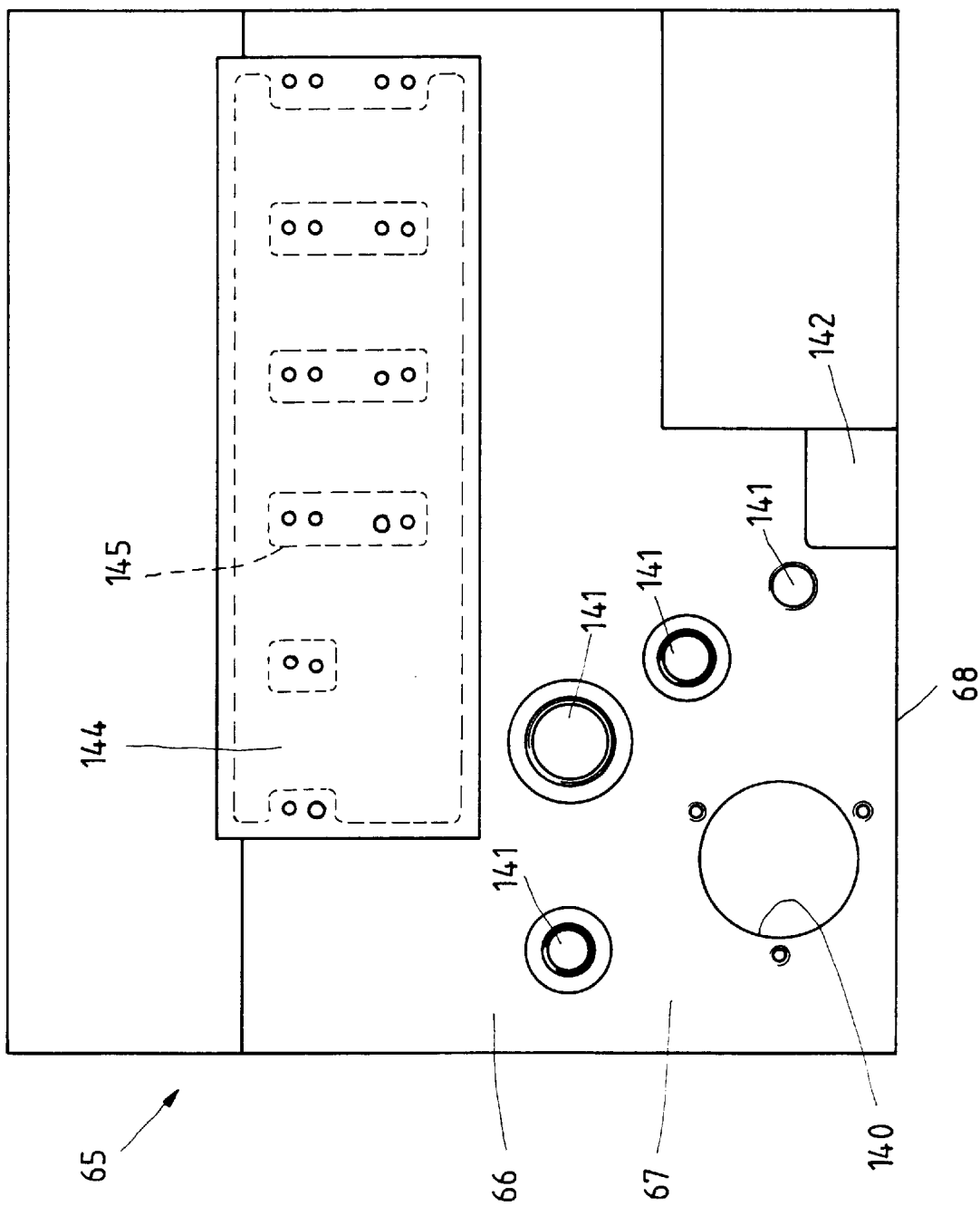

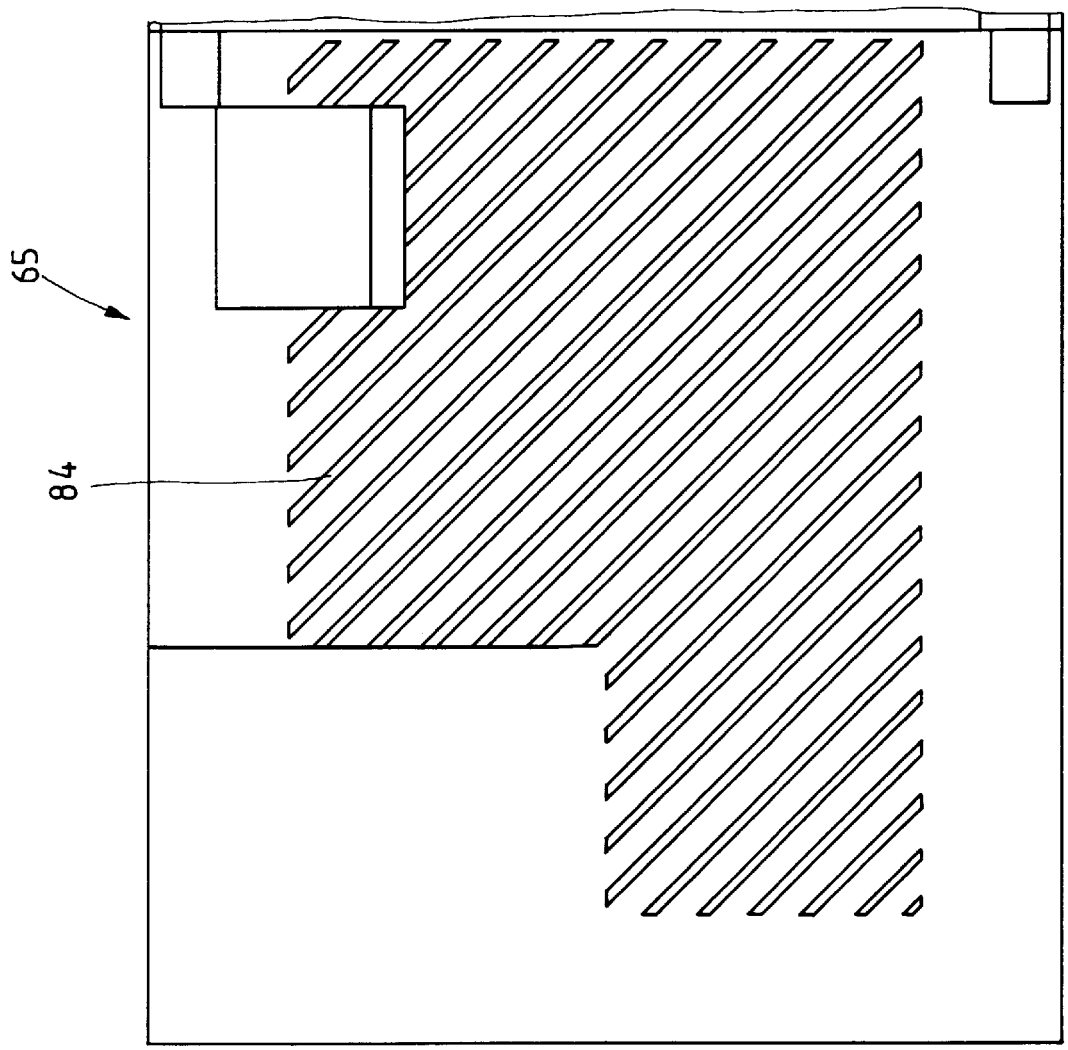

COMPACT HYDRAULIC UNIT

FIELD AND BACKGROUND OF THE INVENTION

The invention concerns from a compact hydraulic unit.

A hydraulic unit with an annular cylindrical pressure medium container, formed by an outer external wall, an inner external wall as well as two end walls and/or end flanges, with a closed electric motor surrounded by the pressure medium container and with a hydraulic pump driveable by an electric motor, is known from DE-GM 82 07 794.

A closed electric motor is used, for example, to prevent small metal parts or current-conducting fluids from entering the interior of the electric motor and causing electrical or mechanical damage there. Closed electric motors are usually cooled by air flowing along their exteriors, with the air stream being generated by a fan wheel.

The hydraulic unit shown in DE-GM 82 07 794 is quite large. The cooling of the electric motor is insufficient for continuous operation of the unit.

SUMMARY OF THE INVENTION

On the other hand, an object of the invention is to provide a compact hydraulic unit with an annular cylindrical pressure medium container, with a closed electric motor, and with a hydraulic pump driveable by the electric motor, the pump being very compact, and with the cooling of the electric motor permitting continuous operation.

According to the invention with a compact hydraulic unit of the above-mentioned type, the pressure medium container fits closely around the electric motor and the inner external wall of the pressure medium container serves as a means of conducting the cooling air stream flowing over the electric motor. The pressure medium container is made to fit closely around the electric motor in two ways. Firstly, a very compact design of the hydraulic unit is achieved. Secondly, the cooling air is conducted over the electric motor and close to it and also flows closely along the housing of the electric motor at the winding heads that are remote from a fan wheel, so that they absorb considerable heat and can transport it out of the interior of the pressure medium container.

Preferably, ribs running axially extend between an external wall of the electric motor and the inner external wall of the pressure medium container. The electric motor can abut the inner external wall of the pressure medium container by means of these ribs. At the same time, the ribs create a large heat loss area and the cooling air can flow between the ribs.

A compact hydraulic unit according to the invention can be manufactured in an especially simple and economical fashion where the inner external wall of the pressure medium container, the ribs, and the external wall of the electric motor are made in one piece. A portion of an extrusion-molded profile can then be used. In the vicinity of a fan wheel, the inner wall and the ribs of the extrusion-molded profile can be turned outward so that the cooling air can easily enter the flow channels between the ribs.

It is also favorable for the manufacture of the compact unit where an endwise flange, preferably every endwise flange, has an axial annular bead that internally centers the inner external wall and externally centers the outer external wall of the pressure medium container. The two end flanges as well as the external walls of the pressure medium container are advantageously held together by tie rods that extend through the pressure medium container. However, it is also possible for the tie rods to extend between the inner external wall of the pressure medium container and the electric motor or outside the pressure medium container.

A small number of individual parts and only a few sealing points are obtained if, one end flange of the pressure medium container is designed as a bottom in one piece with the outer external wall and with the inner external wall of the pressure medium container.

It is possible to secure the electric motor as far as its radial position relative to the pressure medium container is concerned by having it touch the inner external wall of the pressure medium container on the inside. However, the electric motor can also be supported by an end flange of the pressure medium container, so that as a result the radial (and simultaneously also the axial) position of the electric motor relative to the pressure medium container is secured. In particular, an end flange of the pressure medium container can be made integral with a housing part of the electric motor.

It appears especially advantageous where an end flange of the pressure medium container is made integral with a housing part of the hydraulic pump.

Legs for supporting a compact hydraulic unit according to the invention can be advantageously fastened, to at least one end flange of the pressure medium container. In order not to have to use additional fastening means, the legs are advantageously attached to the flange by the same bolts by which an end flange is fastened to the pressure medium container. The flange to which the legs are fastened can has recesses on the outside which are closely adapted to the shape of the legs and determine their positioning. Depending on the desired arrangement, a compact hydraulic unit according to the invention can be mounted in a horizontal or vertical position. Advantageously, the same legs are used for both possibilities, with their arrangement being different when the compact unit is in a horizontal position than when the unit is in a vertical position. Recessess can be provided in a flange of the pressure medium container for both possible arrangements of the legs.

A flange of the pressure medium container can also be provided with a channel or with an opening that is located in a flow path for the pressure medium.

The interior of the pressure medium container from a return opening of the pressure medium container for a distance that is a multiple of the wall thickness of the pressure medium container around the return opening. The extension can be made long enough for its free end to always be below the level of the pressure medium. The pressure medium then flows back into the pressure medium container without being strongly vorticized therein and foaming as a result, and without significant noise being developed.

A cooler for the pressure medium, is preferably located radially inside the inner external wall of the pressure medium container and is thus traversed by the cooling air stream flowing over the electric motor.

In a compact hydraulic unit according to the invention, an effort is also made to use a minimum of externally visible lines or pipes. Therefore, the use of a cooler from which the pressure medium flows directly into the pressure medium container, for example through a opening in an end flange, is especially advantageous. Fluid leaking from the pump and/or fluid returning according to claim 18 is fed to an input of the cooler, preferably along a flow path located inside the pressure medium container. If the cooler is flanged directly to the pressure medium container, a pipe is not required externally on the pressure medium container, either in the feed to the cooler or in the return from the cooler to the pressure medium container. The pipe that runs through the pressure medium container according to claim 19 has its ends in seals that not only seal off the flow path of the pressure medium leading to the cooler from the interior of the pressure container but also prevent metallic contact between the pipe and parts of the pressure medium container, and thus act to damp noise.

In order to be able to use a large fan wheel with a correspondingly large air throughput, the diameter of the cavity surrounded by the inner external wall of the pressure medium container is larger in the vicinity of the fan wheel than downstream from the fan wheel. As a result of the reduction in diameter, the volume of the pressure medium container is not excessively reduced. The transition between the two diameters is preferably made continuously or at an angle so that no air is trapped.

The suction hose of the pump can be designed as a bellows so that it can be curved sharply.

It can be especially economical to make parts of the pressure medium container of plastic.

Reference is also made to the especially advantageous construction where the cooling ribs run externally on the pressure medium container at an angle to its axial direction, preferably at an angle of 45° to the axial direction. This means that no warm air can accumulate beneath a cooling rib in either the vertical or horizontal positions of the compact unit.

BRIEF DESCRIPTION OF THE DRAWINGS

With the above and other objects and advantages in view, the present invention will become more clearly understood in connection with the detailed description of preferred embodiments, when considered with the accompanying drawings of which:

FIG. 2 is a cross section through a first embodiment of the invention;

FIG. 3 is a cross section through a second embodiment of the invention;

FIG. 4 is a radial top view of the first or second embodiment;

FIG. 11 is a section through only the pressure medium container along line XI—XI in FIG. 9;

FIG. 12 is a section through the third embodiment along line XII—XII in FIG. 9;

FIG. 14 is a section along line XIV—XIV in FIG. 13;

FIG. 15 is a section along line XV—XV in FIG. 13;

FIG. 16 is a top view of the external bottom of only the largely octagonal pressure medium container of a fourth embodiment;

FIG. 20 is a top view of the pressure medium container in FIG. 18 as viewed in the direction of arrow K;

FIG. 22 shows, on an enlarged scale, the end of a pipe running through the pressure medium container, with the seal pushed on; and FIG. 23 is a side view of the pressure medium container of a fifth embodiment, in which cooling ribs run diagonally on the external wall of the pressure medium container.

DETAILED DESCRIPTION OF THE PREFERRED EMBODIMENTS

Figure 1:
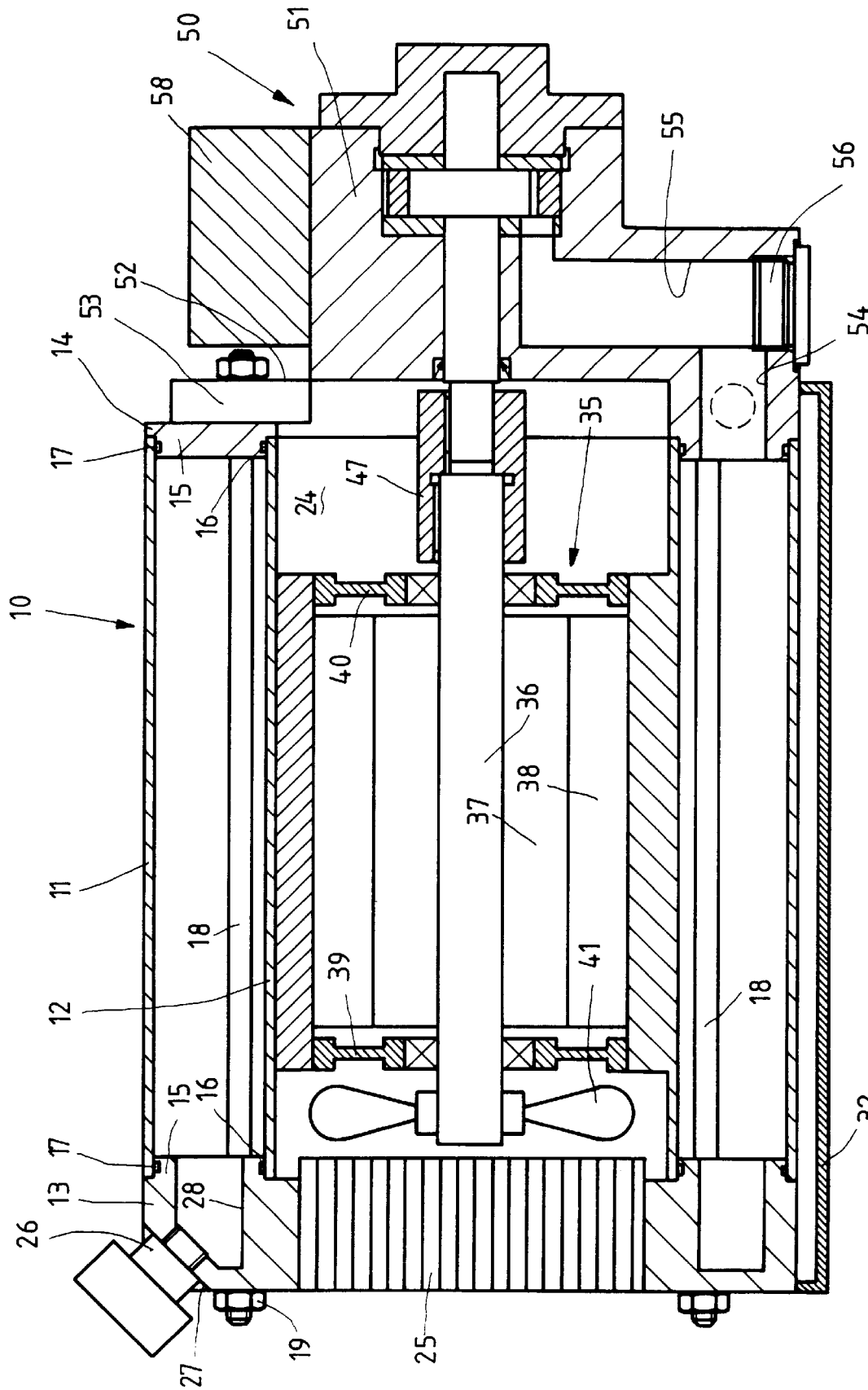
FIG. 1 shows a lengthwise section through the two first embodiments, with the first embodiment being shown in the lower half of the lengthwise section and the second embodiment being shown in the upper half of the lengthwise section.
Figure 5:
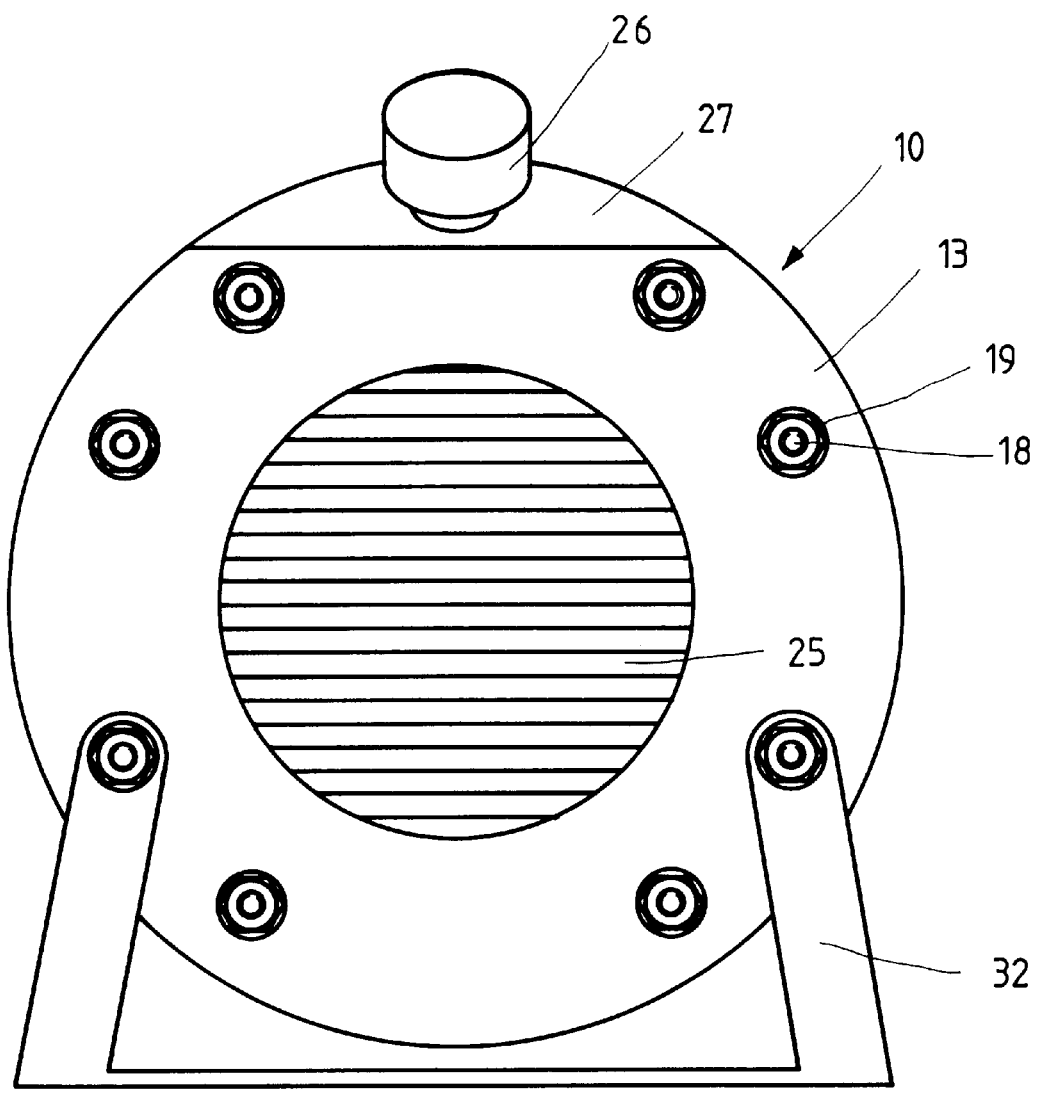
FIG. 5 is a top view of the end of the first or second embodiment.
Figure 6:
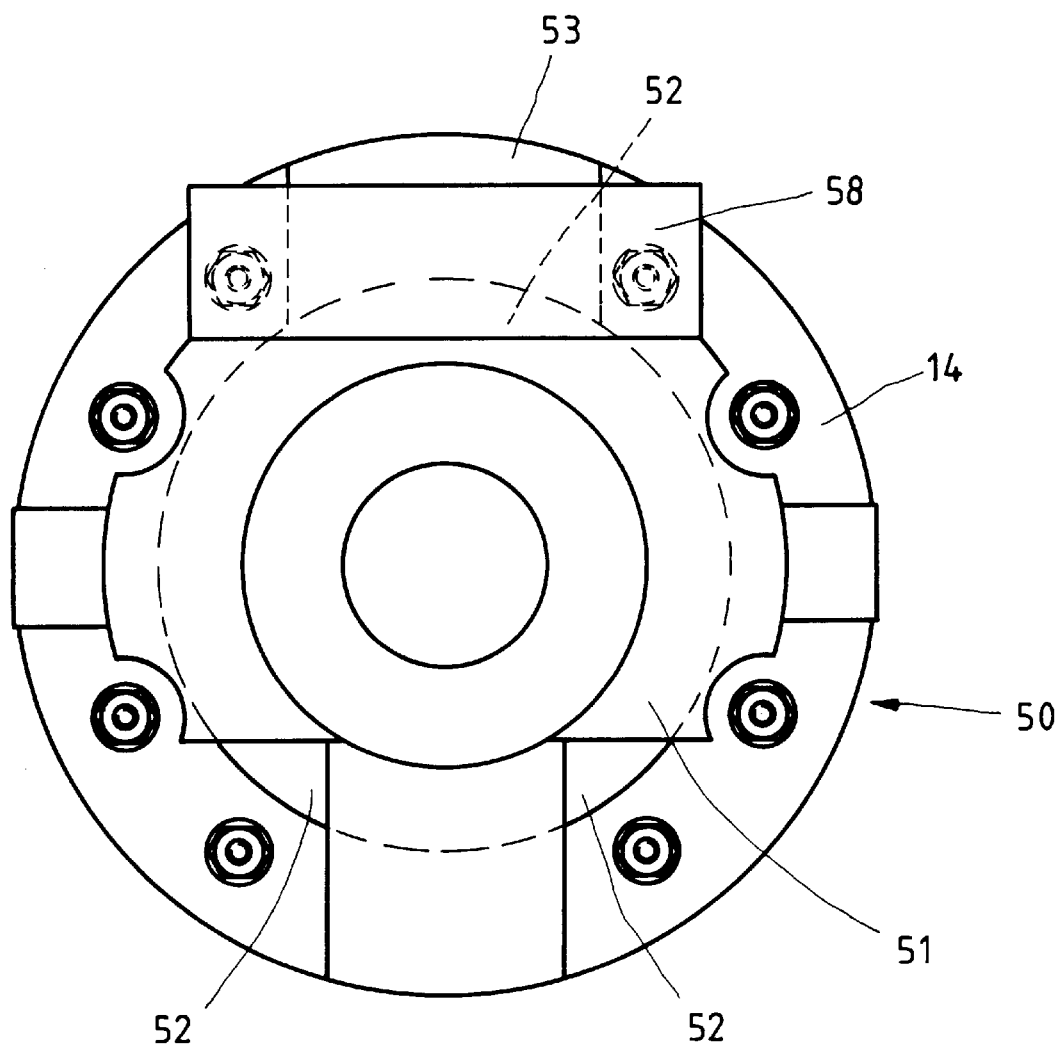
FIG. 6 is a top view of the other end of the first or second embodiment.

Oil container 10 of the first two embodiments has an annual cylindrical, especially a circular annular cylindrical shape, and is formed by an outer container tube 11, an inner container tube 12, and two end flanges 13 and 14. Each of the two flanges has an annular bead 15 that extends in the axial direction, over which bead container tubes 11 and 12 are pushed and which thus centers the two container tubes. An inner and an outer annual groove of annular bead 15 contain sealing rings 16 and 17 that seal the gap between each container tube and the respective annular bead. The two container tubes 11 and 12 as well as the two flanges 13 and 14 are held together with the aid of tie rods 18 that pass through oil container 10 and through flanges 13 and 14, and emerge sealed off from the outside, on which rods the threaded nuts 19 are screwed.

In a central position in front of the cavity 24 surrounded by oil container 10, a circular cooler 25 is located in flange 13 for the oil flowing back to oil container 10. Air can enter cavity 24 through cooler 25. Flange 13 is also provided on its point that is highest when the compact unit is in the operating position, with an oil filler stub 26, located in a flat surface 27 of flange 13 that extends at an angle to the axis of the oil container. An annular channel 28 cast into flange 13 runs from oil filler stub 26 into the interior of oil container 10.

With the aid of two tie rods 18 and the associated threaded nuts 19, a frame 32 is connected to oil container 10.

Cavity 24 contains a closed electric motor 35 with a motor shaft 36, a rotor 37, and a stator 38. The electric motor is shown highly schematically in the drawings. Its motor shaft 36 is mounted in two bearing plates 39 and 40. On a shaft stub that projects beyond bearing plate 40 in the direction of cooler 25, a fan wheel 41 is mounted that draws air in through cooler 25. This air is used not only to cool the oil but also to cool electric motor 35. It is especially advantageous in this regard that in order to produce a compact unit the distance between the inner container tube 12 of the oil container 10 and housing jacket 42 of the electric motor 35 is made small. The free flow cross section for the air stream required for cooling is then sufficient. Cooling ribs 43 extend from housing jacket 42 of electric motor 35 up to the inner container tube 12 or to a point close to the latter, so that the air to the ribs is retained by the inner container tube and the entire amount of air delivered by fan wheel 41 carries heat away. Inner container tube 12 acts like a guide panel that holds the air against ribs 43.

The inner container tube 12, housing jacket 42, and cooling ribs 43 constitute the only differences between the two embodiments shown. In an embodiment in which the lower half of FIG. 1 and FIG. 2 fit, the inner container tube 12, housing jacket 42, electric motor 35, and cooling ribs 43 are made in one piece. For this purpose, a section of an extrusion-molded profile can be used, in which the inner wall and the ribs are turned outward in the vicinity of fan wheel 41. The inner wall and the cooling ribs can also be turned outward in front of the other bearing shield 40, in order to allow the cooling air to escape as freely as possible from the flow channels.

In the embodiment shown in the upper half of FIG. 1 and in FIG. 3, the cooling ribs 43 are made in one piece with the housing jacket 42. The inner container tube 12 on the other hand is a separate part. It is possible to secure electric motor 35 in its position by shrinking on the inner container tube 12.

A hydraulic pump 50 can be driven by electric motor 35 through a clutch 47, said pump being located outside cavity 24 in front of flange 14. A fixed displacement pump or variable displacement pump can be used as the hydraulic pump. Pump housing 51 and flange 14 are made in one piece, with the portion of the part forming the pump housing not engaging the interior of the section forming the flange, but resting on the end of the flange. Pump housing 51 does not cover cavity 24 and/or the internal radius of flange 14 completely, so that there are still individual openings 52 to allow cooling air to pass through. In addition, flange 14 is retracted axially in the vicinity of an upper opening 52, so that a recess 53 is formed in flange 14 that increases the flow cross section for the cooling air.

At its lowest point located opposite recess 53, flange 14 has an axial bore 54 that continues in pump housing 51 and terminates there in a radial bore 55 of pump housing 51. The radial bore is sealed off from the outside by a plug 56. The hydraulic pump 50 draws oil from container 10 through bores 54 and 55. It delivers the oil through a pressure opening 57 located in a block 58 mounted on pump housing 51. This block also has a leaking oil opening 59 from which the oil leaking from the hydraulic pump 50 can escape. This oil is conducted together with the returning oil through cooler 25 into oil container 10.

Figure 9:
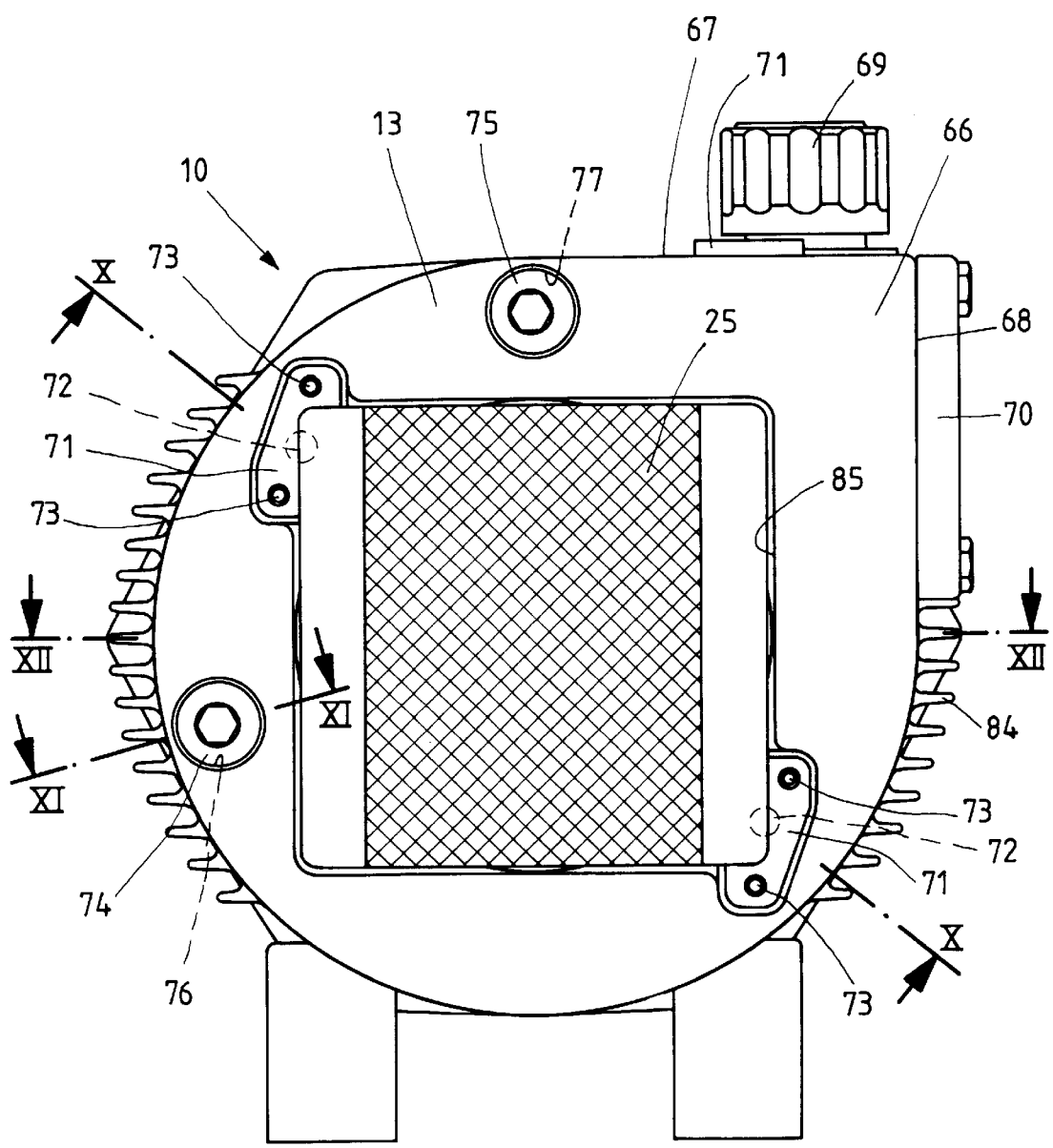
FIG. 9 is a view of the third embodiment as viewed in the direction of arrow G in FIG. 7.

In the third and fourth embodiments, the oil container 10 is likewise made in an annular cylindrical shape but is not composed of four individual parts but essentially of only two. The main part is an annular cylindrical pot 65, which integrally has an outer external wall 11, an inner external wall 12, and a flange 13 that connects the two external walls at one of their ends, said flange possibly being referred to in the following as the container bottom. The second important part of oil container 10 is a second flange 14 referred to in the following as the lid. In the third embodiment, the outer external wall 11 and inner external wall 12 are largely circular cylinders. The outer external wall 11 however locally has a bulge 66 with two wall parts 67 and 68 that are perpendicular to one another. In wall part 67 there is a filling opening that is closed off by a valve with a manually operated knob 69. A level indicator 70 is mounted on wall part 68, whose sight glass communicates with the interior of oil container 10. Further openings can be provided in wall part 67 which are equipped only if desired with a float switch for example or with a return line and, if such is not provided, are sealed by sealing screws 71. An oil cooler 25 is provided in the vicinity of container bottom 13 that, in the axial view shown in FIG. 9, has a largely square outside contour, largely seals axially the cavity located radially inside the internal external wall 12, and is equipped at two opposite corners with mounting ears 71 in which a connecting bore 72 that can be used as an inlet or outlet and in the view according to FIG. 9 is open on the side facing away from the viewer is located, said ears being provided with through mounting bores 73. The four corners of cooler 25 as well as the two mounting ears 71 are received by bottom 13 in matching depressions 85, so that cooler 25, as can be seen from FIG. 7, projects only slightly above bottom 13.

In bottom 13, there are two openings 76 and 77, closed by closure screws 74 and 75 respectively, that are used only if necessary. Opening 77, which is shown at the top in the horizontal operating position of the compact unit shown in FIGS. 7 to 9, serves as the filling opening when the operating position of the compact unit is vertical. Opening 76 provided in the lower half of oil container 10 can serve as a return opening if no cooler 25 is present or if the returning oil is not supposed to flow through cooler 25.

In every depression provided to receive a connecting ear 71 of cooler 25, bottom 13 has an opening 78 or 79 that is flush with connecting bore 72 in a connecting ear of the cooler. Opening 78 is stepped and has a section 80 that expands toward the interior of oil container 10. As a result of a material accumulation, it is approximately four times as long as the wall thickness of bottom 13. In the vicinity of opening 79, bottom 13 has an extension 86 that extends axially almost up to the middle of pot 65 and lengthens opening 79 by a multiple of the wall thickness of bottom 13. Opening 79 is intended for the reverse flow of pressure medium flowing through cooler 25 into oil container 10. Because of extension 86, the end of the return channel is always below the oil level, so that vorticization and foaming of the oil as well as noise are avoided. Pressure medium flows into cooler 25 through opening 78 in a manner to be described below.

As FIG. 11 indicates, return opening 76 that is used when necessary is lengthened by an extension 86, whose end is always submerged in the pressure medium that is in oil container 10, so that even when the return opening 76 is used, the flow of returning oil terminates beneath the oil level.

As is evident especially from FIG. 12, eyes 81 are formed on container bottom 13 and are directed inward, said eyes being drilled if necessary and provided with an internal thread in order optionally to fasten additional devices to pressure medium container 10, for example a temperature sensor for the pressure medium.

Figure 10:
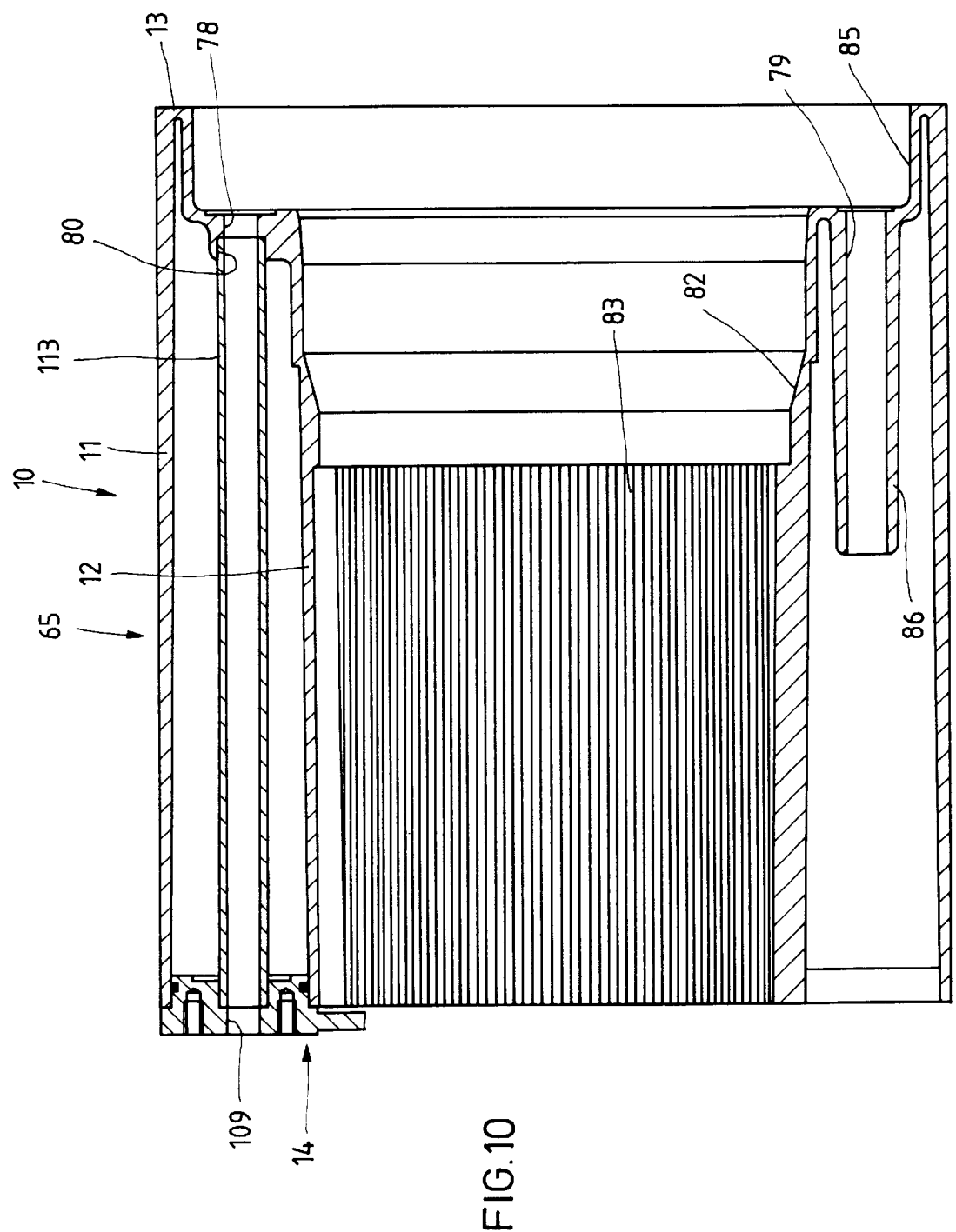
FIG. 10 is a section through only the pressure medium container of the third embodiment along line X—X in FIG. 9.
Figure 13:
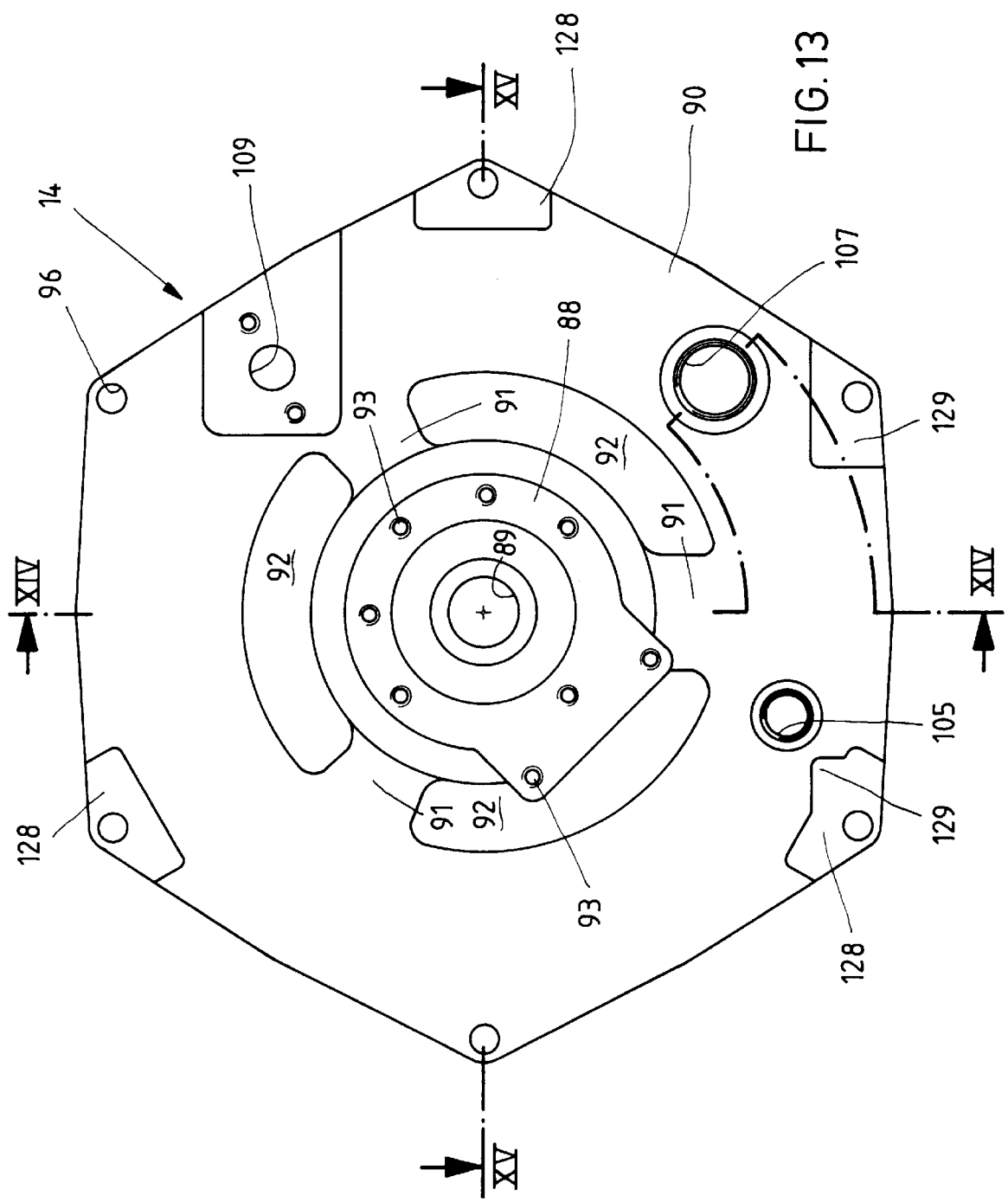
FIG. 13 is an external view of the end flange by which the pressure medium container of the third embodiment is sealed and which is also part of the electric motor surrounded by the pressure medium container.
Figure 17:
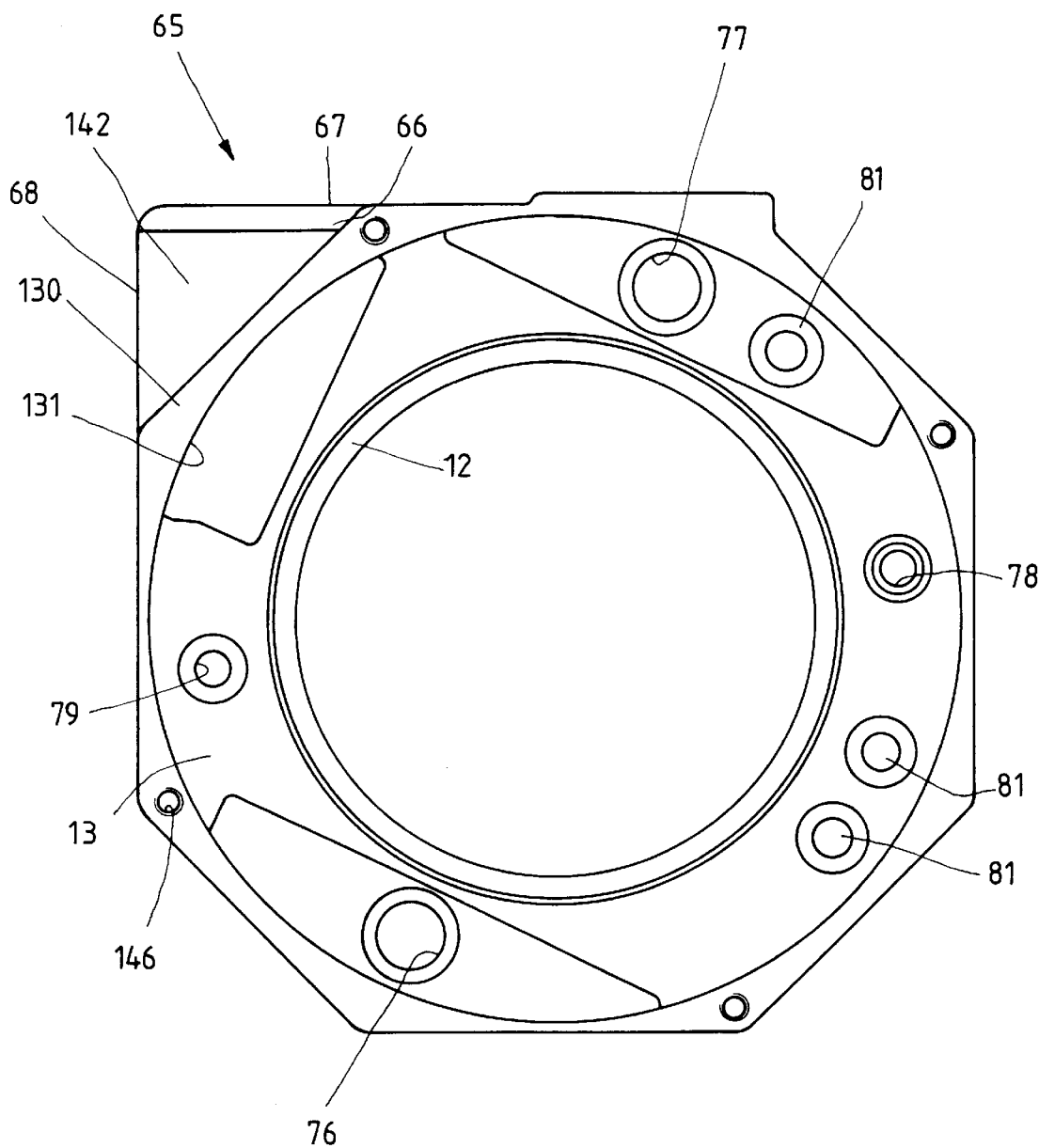
FIG. 17 is a view in the same direction as in FIG. 16 into the interior of the pressure medium container.
Figure 18:
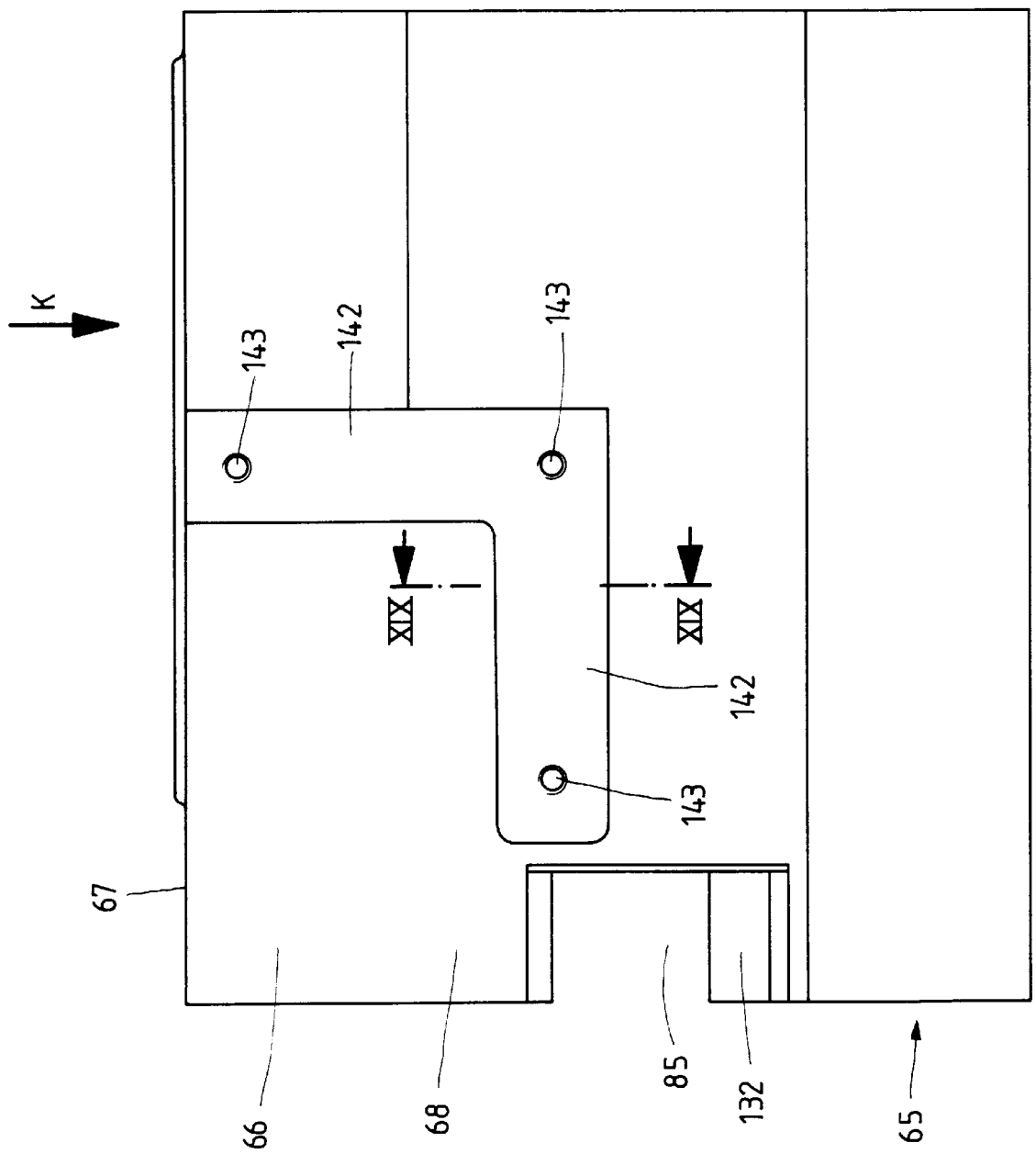
FIG. 18 is a side view of the pressure medium container in FIGS. 16 and 17.
Figure 19:
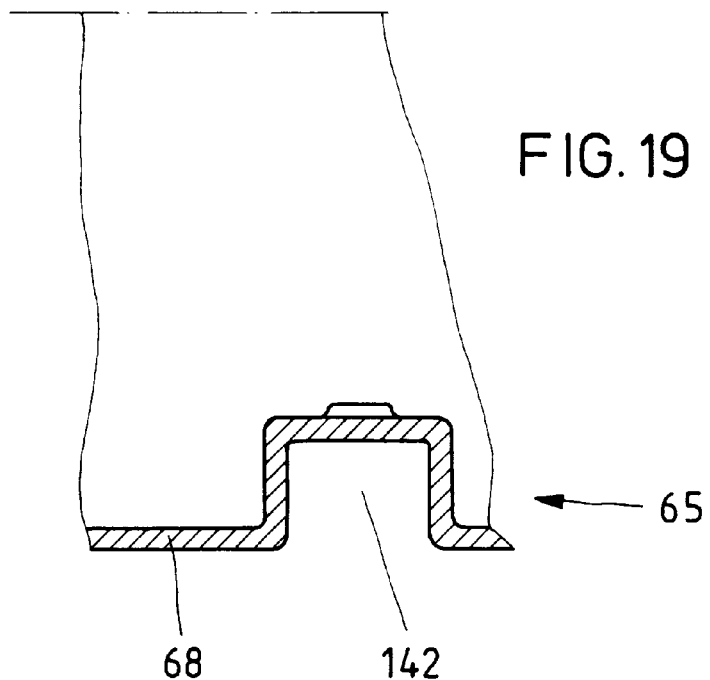
FIG. 19 is a section along line XIX—XIX in FIG. 18.

As in the first and second embodiments, in the third and fourth embodiments as well a fan wheel 41 is mounted on motor shaft 36 of electric motor 35, said wheel being located immediately behind cooler 25. In the vicinity of the fan wheel, as can be seen from FIGS. 10, 11 or 12, the inside and outside diameters of the inner external wall 12 are greater than in the remaining area. As a result, a large fan wheel with a correspondingly high air throughput can be used. At the inner diameter, the transition from the larger to the smaller diameter takes place at a bevel 82, that has a guiding function for the air stream generated by the fan wheel and does not cause any blockage of air.

The inner external wall is provided internally with cooling ribs 83 that run axially and radially inward. Outer external wall 11 has cooling ribs 84 that all run parallel to one another tangentially and therefore permit a simple removal of pot 65 from the mold.

The open end of pot 65 located opposite container bottom 13 is sealed by lid 14. This lid has an inner part 88 with a central passage 89 as well as an external annular part 90 that has, on an annular bead 15, inner and outer annular grooves to receive a sealing ring, and is inserted between the outer external wall 11 and the inner external wall 12 of pot 65 in order to create a closed pressure medium tank. Inner part 88 and outer part 90 are connected with one another by three spokes 91 spaced apart from one another by approximately 120°, said spokes leaving free spaces 92 between them to conduct the air flowing from fan wheel 41 and between electric motor 35 and inner external wall 12. Central part 88 of lid 14 is shaped and provided with mounting bores 93 so that at least two different commercially available hydraulic pumps can be bolted to them. According to FIGS. 7 and 8, a vane pump 50 is installed in the third embodiment.

Lid 14 seals pot 65 and is therefore part of oil container 10. At the same time, however, it is also part of electric motor 35; as one bearing shield thereof, it is connected by tie rods 93 with second bearing shield 94 and with middle housing part 95, as can be seen from FIG. 7. With its inner part 88, lid 14 covers the winding heads of electric motor 85. Lid 14 is made hexagonal externally and has a mounting board 96 in each of its six corners through which a bolt 97 can be screwed into a mounting eye 98 on pot 65 that has an internal thread in order to connect lid 14 and pot 65 with one another. Electric motor 35 is secured in a freely supporting manner by lid 14 without contact with inner external wall 12 of pot 65.

Figure 22:
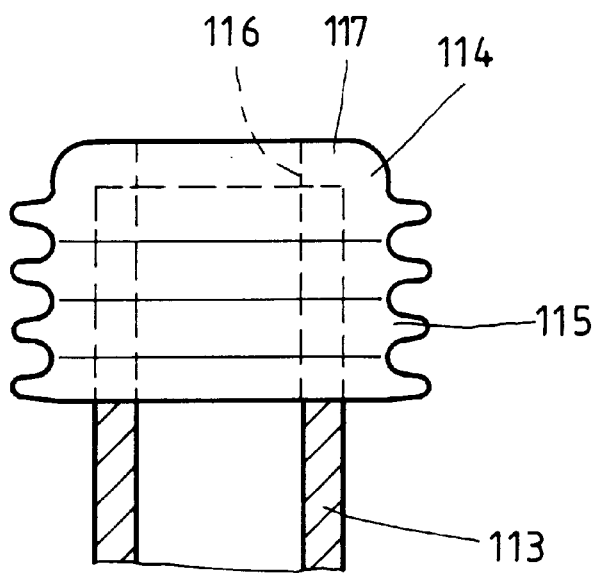

In annular bead 15 of lid 14, there are three openings through which access to the interior of oil container 10 is possible from outside. A first opening 105 serves to drain the oil contained in container 10 and is normally sealed by a sealing screw 106. Through a second opening 107, hydraulic pump 50 draws pressure medium out of container 10 through a suction hose 108. Finally, in the vicinity of a third opening 109, a plate 110 is mounted externally on lid 14, said plate receiving leaking oil from hydraulic pump 50 through a hose 111 and having a provisionally closed return connection 112. An outlet from plate 110 merges with opening 109 of lid 14. Lid 114 is mounted on pot 65 in such fashion that its opening 109 is flush with opening 78 in container bottom 13. Like opening 78, opening 109 is stepped. Between the two openings, a tube 113 extends axially (see FIG. 10) over each of whose ends a seal 114 is slid and which is inserted together with seal into the expanded portion 80 of the two openings. The nature of seal 114 is more evident from FIG. 22. One can see that it has a portion 115 that is located radially outside tube 113 and is grooved externally, as well as a section 117 that is located axially in front of the end of tube 113 and is provided with a central passage 116. Direct contact between tube 113 and container bottom 13 or lid 14 of oil container 10 is prevented by seal 114. The seal extends relatively far over tube 113 so that lengthwise tolerances can be compensated. On the other hand, the seal is relatively flexible because of the grooves in its radial exterior circumference and is therefore easy to install alone or together with the tube in openings 78 and 109.

Oil leaking from hydraulic pump 50 and oil flowing back from the system therefore pass through plate 110 and opening 109 in lid 14 into tube 113. The oil flows through tube 113 and passes through opening 78 into cooler 25. After it has flowed through the cooler, it enters opening 79 of pot 65 and reaches container 10 through extension 80.

Figure 7:
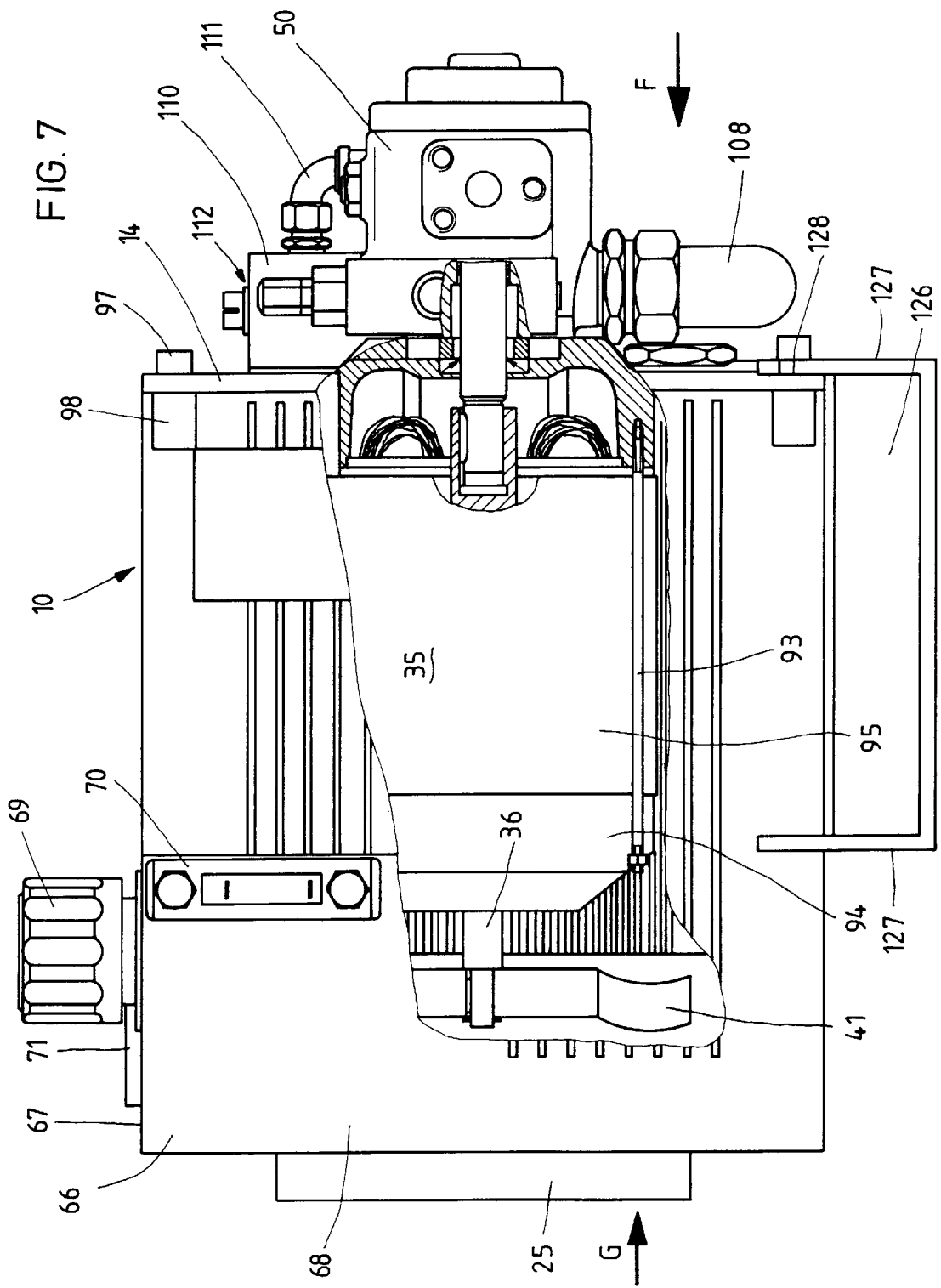
FIG. 7 is a third embodiment that is shown partially in a side view and partially in an axial section.
Figure 8:
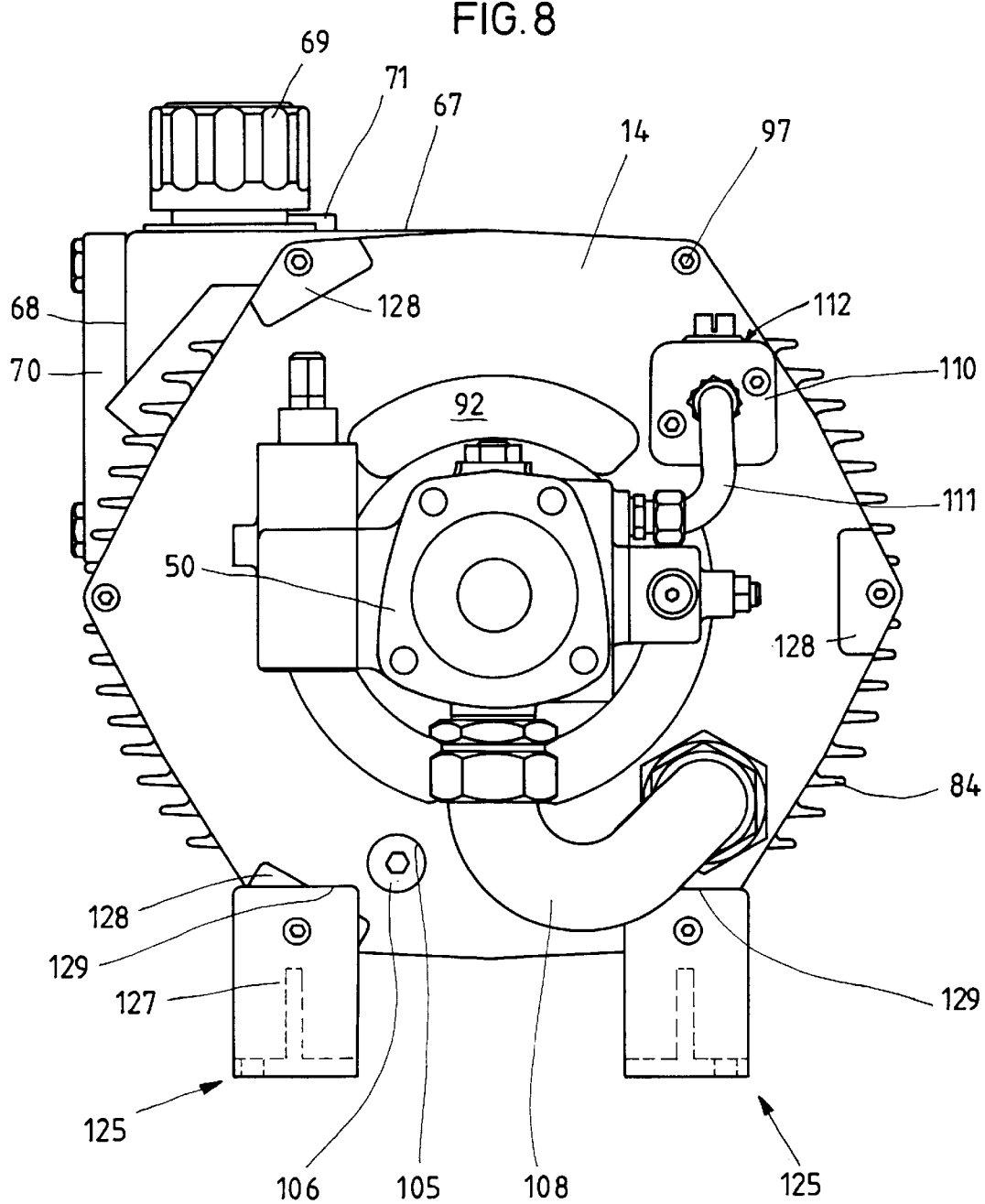
FIG. 8 is a side view of the third embodiment as viewed in the direction of arrow F in FIG. 7.

According to FIGS. 7, 8, and 9, the compact hydraulic unit is in a horizontal operating position in which it is supported on a bottom by two legs 125. Each leg consists of a portion of T-profile 126, to each of whose ends a flat piece of iron 127 is welded. On the outside of rib 14, at every other mounting bore 96, a depression 128 is provided that has two boundaries that extend parallel to a radial stream through the middle of a mounting bore 96 and a boundary that extends perpendicularly to the radial stream. The distance between the two parallel boundaries corresponds to the width of a flat piece of iron 127. Each depression 128, with the compact unit in a vertical operating position, can accept a flat piece of iron 127 of a leg 125 in such fashion that the middle rib of the T-profile 126 lies in a plane that passes through the axis of the unit. The three legs 125 then extend away from lid 14 along hydraulic pump 50. With the compact unit in a horizontal operating position as shown in FIGS. 7 to 9, a depression 129 is provided in the vicinity of another mounting bore 96, said depression having a boundary line that is parallel to a vertical plane and is parallel to a horizontal plane. In addition, a bulge 129 is provided in one of depressions 128, said bulge likewise being delimited by a boundary that is in a vertical plane and by a boundary that is in a horizontal plane. The two depressions 129 receive two legs 125 in such fashion that the two cross ribs of the two T-profiles 126 lie in a plane. The legs extend from lid 14 in the direction of container bottom 13.

Figure 21:
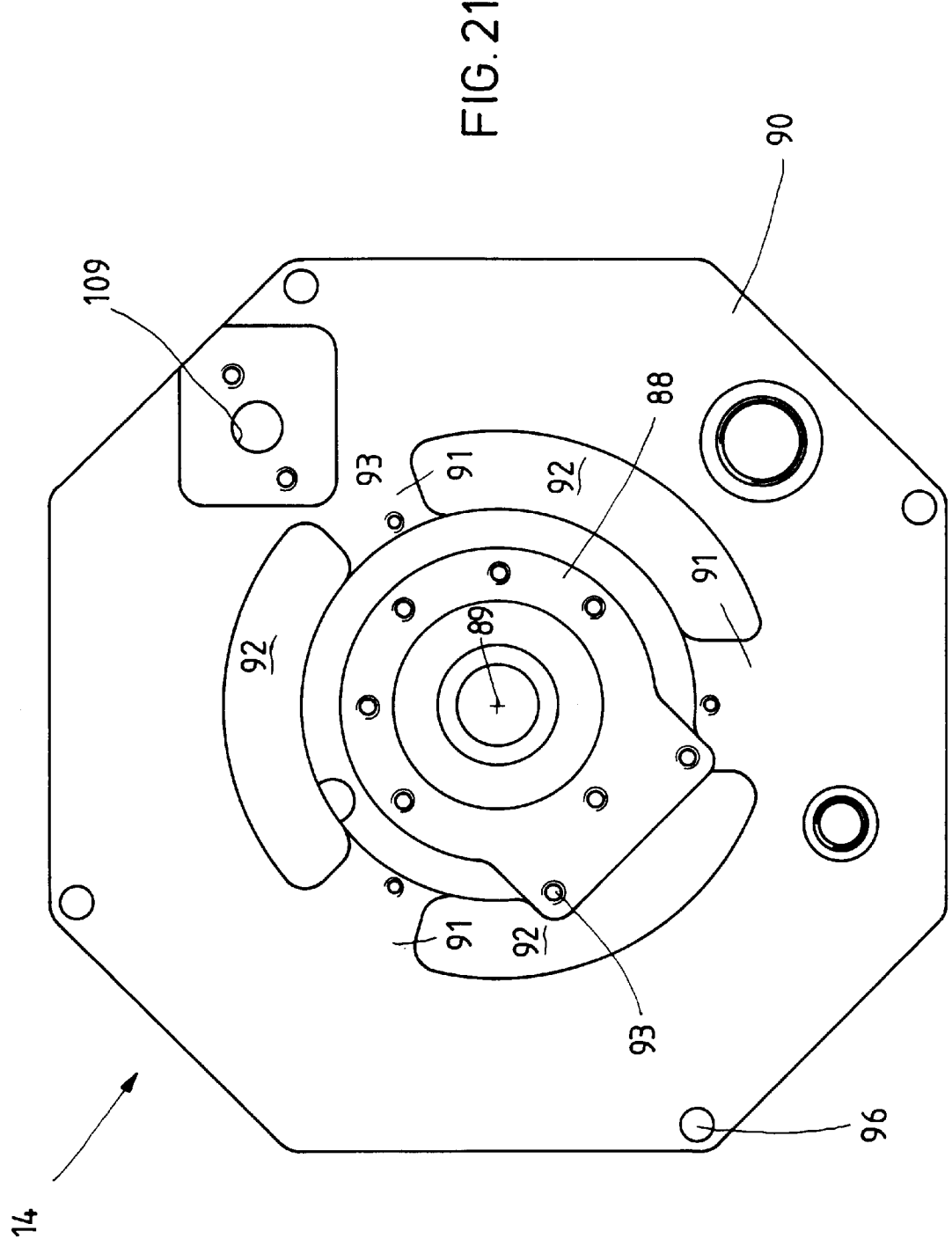
FIG. 21 is an external view of the sealing flange for the pressure medium container according to FIGS. 16 to 20.

The basic design of the fourth embodiment, of which the container pot 65 is shown in FIGS. 16 to 20 and lid 14 is shown in FIG. 21, corresponds to that of the third embodiment. The considerably different feature is that the outer external wall 11 of the housing pot is now not circularly cylindrical but octagonal. On the open side of container pot 65, an edge 130 is drawn slightly inward from external wall 11, said edge terminating at a circular edge 131. The inner external wall 12 is designed to be circularly cylindrical as in the third embodiment so that container pot 65 is open in the shape of a circular ring between the inner external wall 12 and edge 130. In the bottom 13 of container pot 65 there are once again two threaded bores 76 and 77, with opening 77 being usable as a filling opening in the vertical operating position of the compact unit and with opening 76 serving as a return opening. To receive a cooler, bottom 13 again has depressions 85 that extend up to the outer edge of the container bottom 13 in the area in which the connecting ears of the cooler are located. Otherwise it is evident from FIG. 16 that the essentially square receiving space formed for a cooler by depressions 85 is located in bottom 13 in such fashion that its boundary surfaces 132 run parallel to two connecting lines between opposite corners of housing pot 65. Two openings 78 and 79 are provided in cooler bottom 13 to allow pressure medium to flow into the cooler and for the return from the cooler into container pot 65. Finally, in the internal view in FIG. 17, individual eyes 81 can be seen, standing up from container bottom 13 and intended for threaded bores to be provided later.

Like the container pot 65 of the design in FIGS. 7 to 15, the container pot 65 of the design shown in FIGS. 16 to 20 has an external bulge 66 with wall parts 67 and 68 that are perpendicular to one another. In wall 67 there is a filling opening 140 that is utilized with the compact unit in a horizontal operating position, as well as several other openings 141 of different sizes, which are provided with sensors or lines as needed or are sealed by sealing screws. In bulge 66 there is a rectangular depression 142 with two legs, with one leg being vertical and the other leg extending horizontally when the compact unit is in a horizontal or vertical operating position. A level sensor is used in the vertical leg in each case. The depressed arrangement protects the level sensor against damage. Of the three holes 143 in depression 142, two are always used for mounting the level indicator while the third is sealed. Wall parts 67 and 68 of bulge 66 each abut, without a transition, one of the eight wall parts of the outer external wall 11 of container pot 65 that adjoin one another at obtuse angles.

To install valves on container pot 65, the pot has an area 144 that is slightly elevated with respect to one of the above-mentioned wall parts, at which area the individual material thickenings 145 facing the interior of container pot 65 are molded in order to be able to make mounting bores that are sufficiently long.

The lid shown in FIG. 21 of the fourth embodiment is largely the same as the lid in the third embodiment. The reference numbers of similar openings and parts are therefore adopted from FIG. 13 in FIG. 21 without discussing the embodiments in greater detail. Reference is made only to three differences. Firstly, lid 14 according to FIG. 21 now has an octagonal outer contour that matches container pot 65 of the fourth embodiment, said contour being flush with the outer contour of the container pot. The annular bead of lid 14 inserted between edge 131 of outer external wall 11 and inner external wall 12 of container pot 65, on the other hand, is similar to the annular bead of the lid in FIG. 13. Secondly, lid 14 according to FIG. 21 does not have six but only four mounting bores 96, each of which is located in a corner of the outside contour. The four mounting bores 96 are aligned with four mounting bores 146 in edge 130 of housing pot 65, so that bolts inserted through bores 96 can be screwed into bores 146. In order for bores 146 to be sufficiently long, a thickened area of material is provided with a bore 146 below edge 130 in each corner of container bottom 65. The third difference between the two lids in FIGS. 21 and 13 consists in the fact that the lid according to FIG. 21 has no depressions 128 or 129 for legs.

Container pot 65 according to FIG. 23 largely corresponds to the container pot of the embodiment in FIGS. 7 to 15. The only difference is in the pattern of cooling ribs 84 on the exterior of outer external wall 11. These cooling ribs do not run parallel to the axis of container pot 65, but in parallel planes that intersect the axis at an angle of 45°. Thus, in neither the horizontal nor the vertical operating position of the compact unit is there any accumulation of heat on the underside of a cooling rib. Instead, warm air can be drawn off upward in any operating position.

It should be pointed out that a number of the features mentioned in the subclaims or in the specification can also be used advantageously, independently of the design according to claim 1.

What is claimed is:

1. Compact hydraulic unit with an annular cylindrical, especially a circularly annular cylindrical pressure medium container (10) that has an outer external wall (11) and an inner external wall (12) as well as two end flanges (13, 14), with an electric motor (35) that is closed, surrounded by pressure medium container (10) and cooled by a cooling air stream communicating with the external environment for withdrawal of heat, and with a hydraulic pump (50) driveable by said electric motor (35), wherein the pressure medium container (10) closely surrounds the electric motor (35), and the inner external wall (12) of said pressure medium container (10) serves as a guide means for the cooling air stream flowing over said electric motor (35).

2. Compact hydraulic unit according to claim 1, further comprising ribs (43), extending axially, said ribs run between an external wall (42) of the electric motor (35) and the inner external wall (12) of the pressure medium container (10).

3. Compact hydraulic unit according to claim 1, wherein an end flange (13, 14) has an axial annular bead (15), said bead centering the inner external wall (12) of said pressure medium container (10) internally and the outer external wall (11) of said pressure medium container (10) externally.

4. Compact hydraulic unit according to claim 1, wherein one of the end flanges (13) of said pressure medium container (10) is made in one piece with the outer external wall (11) and with the inner external wall (12) of said pressure medium container (10) as a container bottom.

5. Compact hydraulic unit according to claim 1, wherein said electric motor (35) is supported by the end flange (14) of said pressure medium container (10).

6. Compact hydraulic unit according to claim 5, wherein the end flange (14) of said pressure medium container (10) is made in one piece with a housing part (51) of said electric motor (35).

7. Compact hydraulic unit according to claim 5, wherein the end flange (14) connected with said electric motor (35) has an inner part (88) on which said electric motor (35) is fastened, an outer annular part (90) by which said pressure medium container (10) is sealed, as well as spokes (91), extending between the inner part (88) and the outer part (90), between which the cooling air stream passes through the flange (14).

8. Compact hydraulic unit according to claim 1, wherein end flange (14) of said pressure medium container (10) is made in one piece with a housing part (51) of said hydraulic pump (50).

9. Compact hydraulic unit according to claim 1, wherein legs (125) are mounted on at least one end flange (14) of said pressure medium container (10).

10. Compact hydraulic unit according to claim 9, wherein recesses (128, 129) for the legs (125) are provided externally on an end flange (14), especially on the end flange (14) in front of which said hydraulic pump (50) is located, with said recesses (128, 129) closely matching the shape of the legs (125) and defining their positions.

11. Compact hydraulic unit according to claim 1, wherein the pressure medium is supplied from said pressure medium container (10) to said hydraulic pump (50) and/or the pressure medium is returned to said pressure medium container (10) through a channel (54) in an end flange (14) of said pressure medium container (10).

12. Compact hydraulic unit according to claim 11, wherein a tubular extension (86) extends from a return opening (76, 79) of said pressure medium container (10) for a multiple of the wall thickness around return opening (76, 79) into the interior of said pressure medium container (10).

13. Compact hydraulic unit according to claim 1, wherein a cooler (25) for the pressure medium is located in an end flange (13) largely inside the inner external wall (12) of said pressure medium container (10).

14. Compact hydraulic unit according to claim 1, wherein a cooler (25) for the pressure medium is located radially, largely inside the inner external wall (12) of said pressure medium container (10) in the vicinity of one end flange (13), the second flange (14) has an opening (109) in the area between the inner and outer external walls (11, 12) of the pressure medium container (10), to which returning fluid can be supplied, the first flange (13) has an opening (78) in the area between the inner and outer external walls (11, 12) of said pressure medium container (10) through which pressure medium can be introduced into the cooler, and a line (113) extends from the opening (78) in the first flange (13) to the opening (109) in the second flange (14) inside said pressure medium container (10).

15. Compact hydraulic unit according to claim 14, further comprising a seal (114) between an end of the line (113) and a flange (13, 14).

16. Compact hydraulic unit according to claim 1, wherein the cooling air stream is generated by a fan wheel (41) located radially inside the inner external wall (12) of said pressure medium container (10) and mounted on shaft (36) of said electric motor (35).

17. Compact hydraulic unit according to claim 16, wherein the diameter of the cavity surrounded by the inner external wall (11) of said pressure medium container (10) is larger in the vicinity of said fan wheel (41) than downstream of said fan wheel (41).

18. Compact hydraulic unit according to claim 17, wherein the transition between the two diameters takes place continuously or at an angle.

19. Compact hydraulic unit according to claim 1, wherein the suction inlet of said hydraulic pump (50) is connected with a suction outlet (107) of said pressure medium container (10) through a suction hose formed as a bellows.

20. Compact hydraulic unit according to claim 1, wherein the outer external wall (11) of said pressure medium container (10) is provided externally with cooling ribs (84), and said cooling ribs (84) extend at an angle to the axial direction of said pressure medium container (10), preferably at an angle of 45°.

21. A hydraulic unit comprising a motor having a shaft for coupling to a pump, and a cylindrical chamber encircling the motor and having a connection for communicating with the pump; wherein upon a driving of the pump by the motor, fluid is driven by the pump through the chamber; and wherein the hydraulic unit further comprises a cooling air passage located between at least a portion of said motor and said chamber, said passage communicating with an environment exterior to the hydraulic unit; wherein, upon a flow of air through the passage to the external environment, heat is withdrawn by the air from both said motor and from the fluid within said chamber to the external environment.

22. A hydraulic unit according to claim 21 further comprising a fan disposed in said passage and driven by said motor for forcing the air through said passage.

23. A hydraulic unit according to claim 22 further comprising said pump wherein, upon energization of said motor, said motor drives both of said pump and said fan.

* * * * *